(12) United States Patent
Martinez

(10) Patent No.: US 11,958,399 B2
(45) Date of Patent: Apr. 16, 2024

(54) STRAP END MANAGER

(71) Applicant: Rodrigo Martinez, Hacienda Heights, CA (US)

(72) Inventor: Rodrigo Martinez, Hacienda Heights, CA (US)

(*) Notice: Subject to any disclaimer, the term of this patent is extended or adjusted under 35 U.S.C. 154(b) by 318 days.

(21) Appl. No.: 17/469,541

(22) Filed: Sep. 8, 2021

(65) Prior Publication Data

US 2021/0402912 A1  Dec. 30, 2021

Related U.S. Application Data

(63) Continuation-in-part of application No. 16/662,979, filed on Oct. 24, 2019, now Pat. No. 11,117,509.

(51) Int. Cl.
B60P 7/08 (2006.01)

(52) U.S. Cl.
CPC ........... B60P 7/0846 (2013.01); B60P 7/0853 (2013.01)

(58) Field of Classification Search
CPC ....... B60P 7/0846; B60P 7/083; B60P 7/0869; B60P 7/0853
See application file for complete search history.

(56) References Cited

U.S. PATENT DOCUMENTS

| | | | |
|---|---|---|---|
| 3,731,348 A * | 5/1973 | Luehne | A63C 11/021 24/442 |
| 4,120,437 A | 10/1978 | Hara | |
| 5,197,760 A * | 3/1993 | Schollenberger | A63C 11/02 280/814 |
| 5,468,036 A * | 11/1995 | Brown | A63C 11/025 294/147 |
| 6,138,882 A * | 10/2000 | Buettner | A45C 15/00 248/104 |
| 6,776,528 B2 | 8/2004 | Wills | |
| 6,896,458 B1 | 5/2005 | Romero | |
| 7,587,796 B1 | 9/2009 | Schultz | |
| 8,256,196 B2 * | 9/2012 | Burns | B68B 1/06 54/1 |
| 8,371,000 B1 * | 2/2013 | Schultz | B65D 63/10 24/442 |
| 9,360,274 B2 | 6/2016 | Horwitz | |
| 10,843,619 B1 | 11/2020 | Carter | |
| 2004/0000570 A1 * | 1/2004 | Forsman | A45F 3/047 224/579 |
| 2014/0250644 A1 | 9/2014 | Thurlow | |
| 2015/0136626 A1 * | 5/2015 | Hagan | B60P 7/0846 206/389 |
| 2015/0336498 A1 | 11/2015 | Hale | |
| 2018/0105093 A1 | 4/2018 | Wood | |

* cited by examiner

*Primary Examiner* — Robert Sandy
*Assistant Examiner* — Rowland Do
(74) *Attorney, Agent, or Firm* — Averill, Green & Kim; Philip Y Kim; Kenneth L. Green

(57) ABSTRACT

A strap end manager holds a loose cargo strap end against a tight portion of the strap. The manager fits over an end of a loose strap, and the loose strap is wound around the manager. Top and bottom, right and left wings, fold around the strap and around the tight portion, and secure the wound loose end. The wings may include hook and loop material to retain the wings around the wound loose end. The strap end manager may further be used to facilitate storing cargo straps in the same manner as for holding loose cargo strap ends.

20 Claims, 6 Drawing Sheets

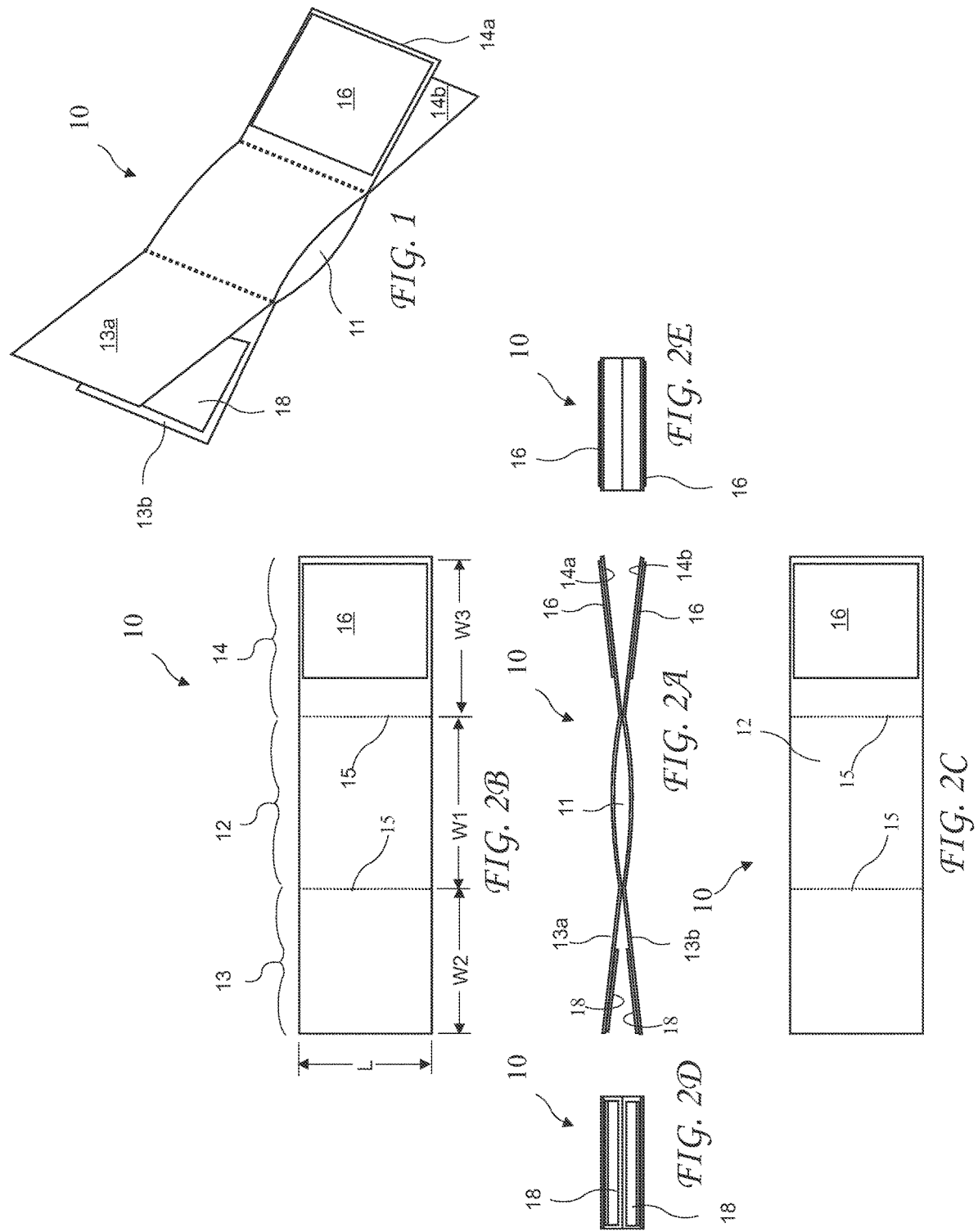

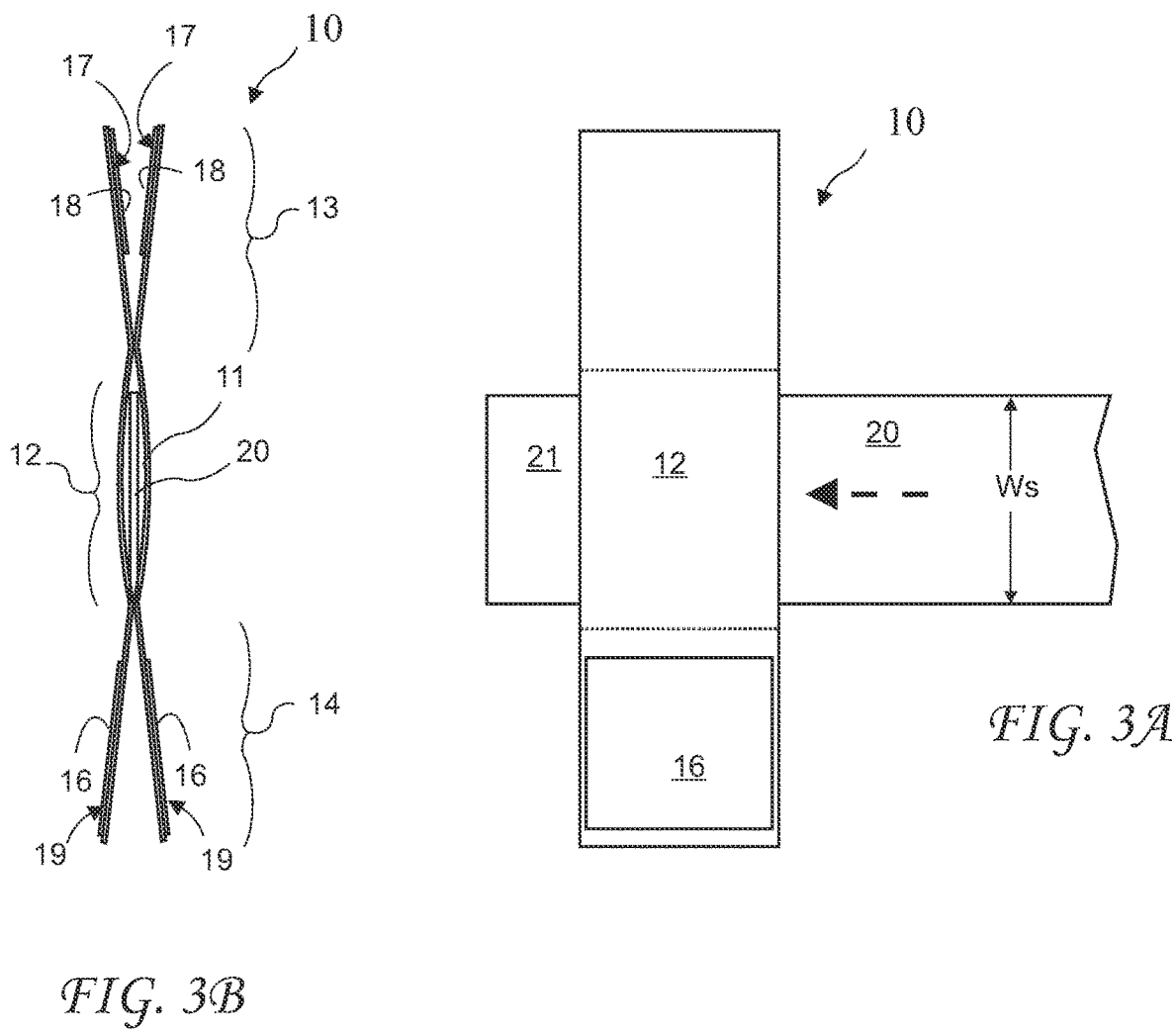
FIG. 3A
FIG. 3B
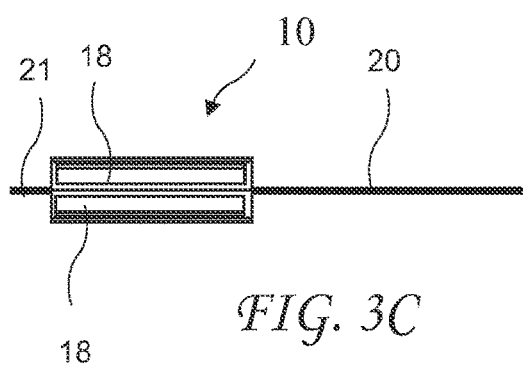
FIG. 3C

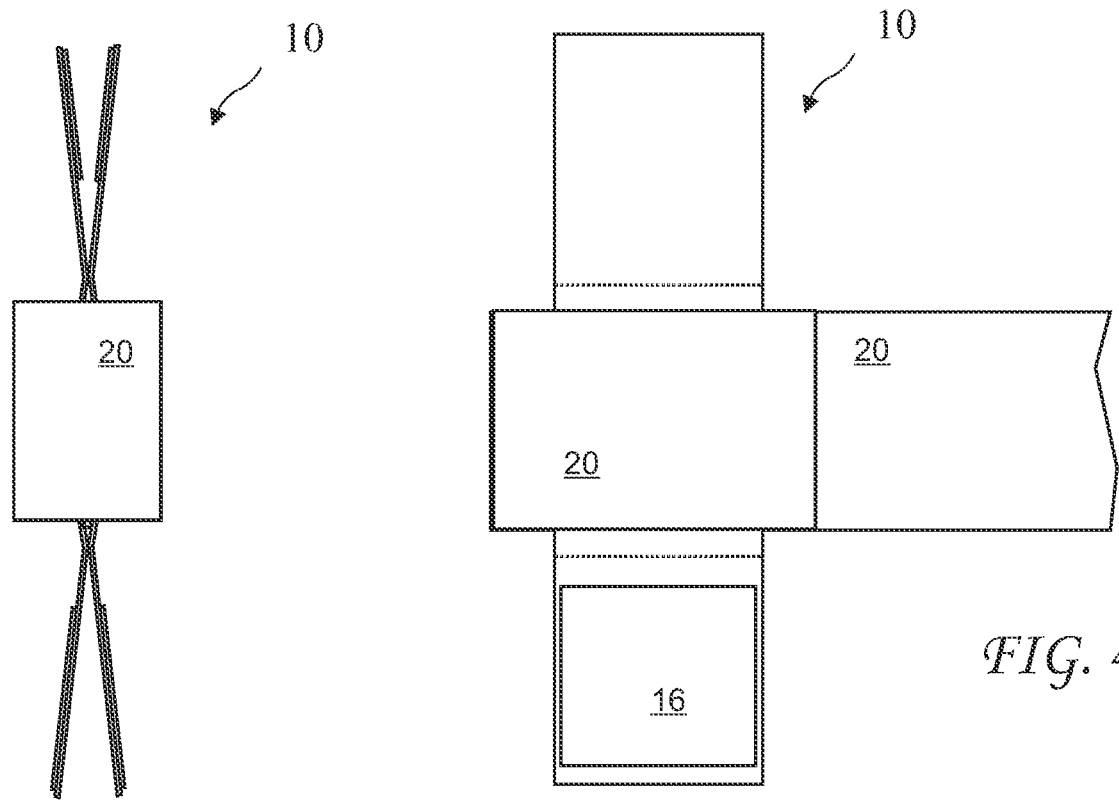
FIG. 4A
FIG. 4B
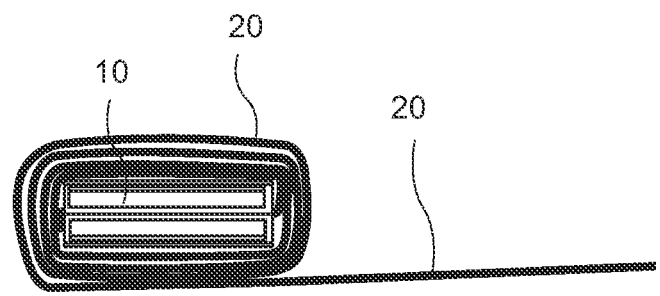
FIG. 4C

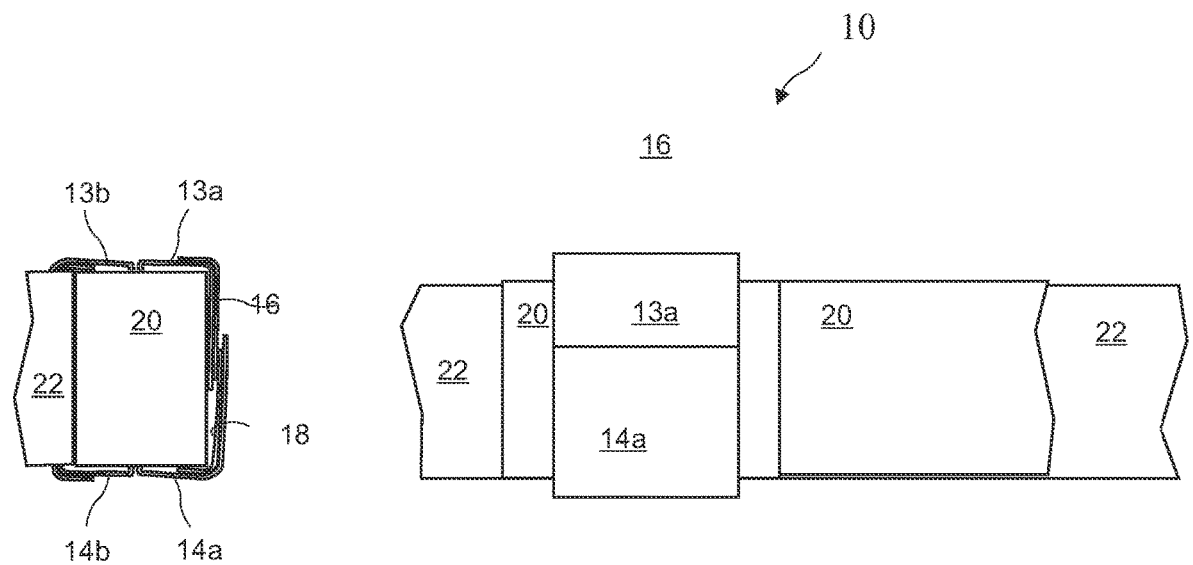
FIG. 5B
FIG. 5A
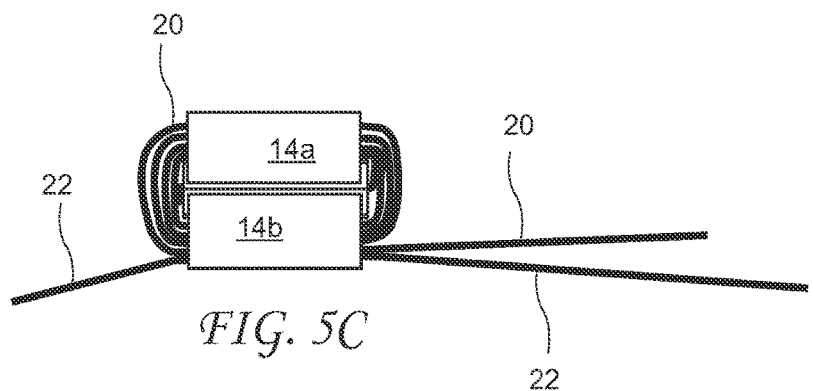
FIG. 5C

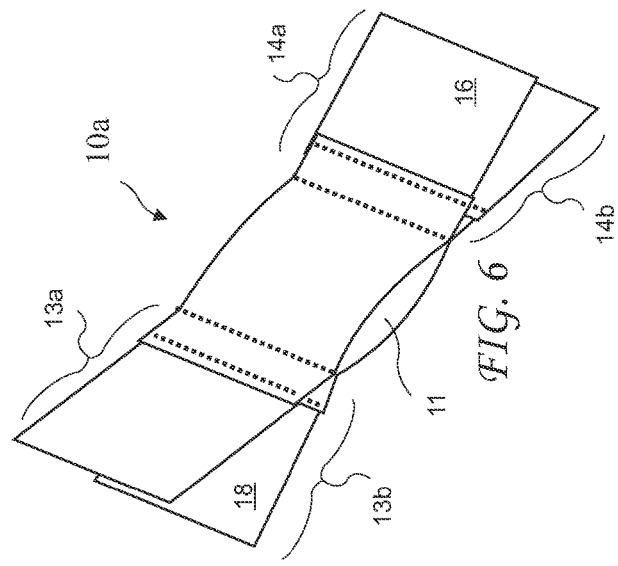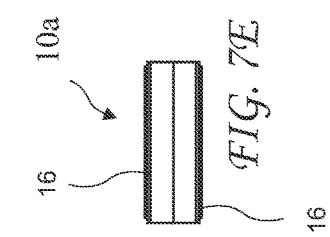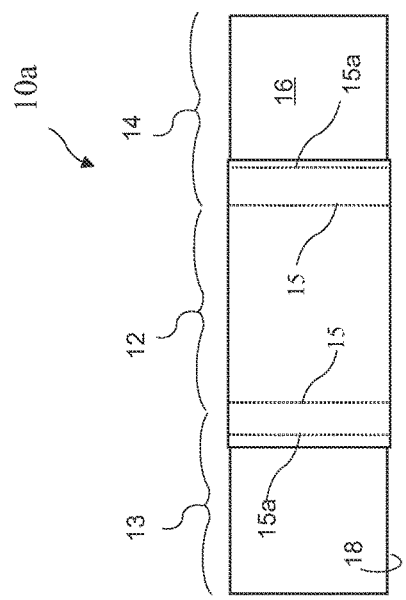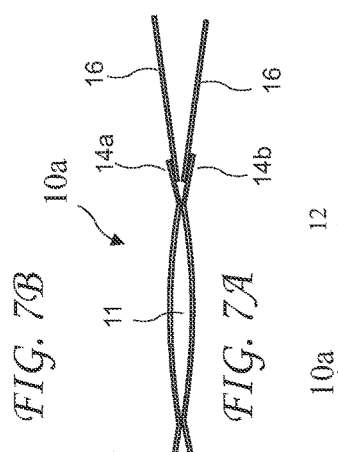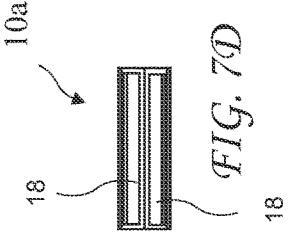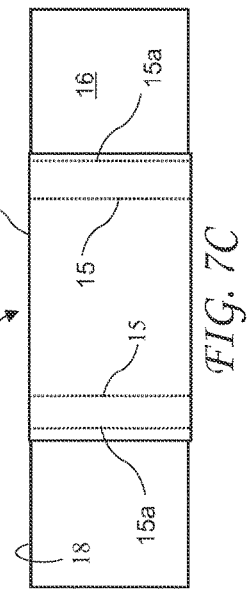

STRAP END MANAGER

CROSS-REFERENCE TO RELATED APPLICATIONS

The present application claims the priority of U.S. patent application Ser. No. 16/662,979 filed Oct. 24, 2019, which application is incorporated in its entirety herein by reference.

BACKGROUND OF THE INVENTION

The present invention relates to cargo straps and in particular to strap manager used to gather and retain a loose strap end.

Cargo straps are commonly used to retain various items on trailers, truck beds, and inside trucks. The straps are generally longer than needed to allow use on various size items. When the straps are used on trailers and trucks, an unused portion of the strap generally hangs loose from a buckle, and often presents a problem if it can catch onto a stationary object, or wave in the wind.

BRIEF SUMMARY OF THE INVENTION

The present invention addresses the above and other needs by providing a strap end manager which holds a loose cargo strap end against a tight portion of the strap. The strap manager fits over an end of a loose strap, and the loose strap is wound around the manager. Top and bottom, right and left wings, fold around the strap and around the tight portion, and secure the wound loose end. The wings may include hook and loop material to retain the wings around the wound loose end. The strap end manager may further be used to facilitate storing cargo straps in the same manner as for holding loose cargo strap ends.

In accordance with one aspect of the invention, there is provided a strap end manager having a center portion with a mouth for insertion of a strap end, and wings on right and left sides of the mouth. A loose cargo strap end is wound around the center portion and then the wings are folded over the wound strap end and joined to hold the wound strap end.

In accordance with another aspect of the invention, there is provided a method for managing loose strap ends. The method includes inserting a loose strap end into a strap end manager, winding the loose strap end around the strap end manager, folding a right upper wing having first hook or loop material on an outer surface, over the wound strap end, folding a left upper wing having cooperating first hook or loop material on an inner surface, over the right upper wing, engaging the first hook and loop material, engaging the first hook and loop material with the cooperating first hook or loop material, folding a right lower wing having second hook or loop material on an outer surface, under the wound strap end, and a tightened portion of the strap, folding a left lower wing having cooperating hook or loop material on an inner surface, under the right lower wing, and engaging the second hook and loop material with the cooperating second hook or loop material.

In accordance with yet another aspect of the invention, there is provided a strap end manager for storing cargo straps. The cargo strap is wound around the center portion and then the wings are folded over the wound strap and joined to hold the wound strap.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 shows a top and front view of a strap manager according to the present invention.

FIG. 2A shows a front view of the strap manager according to the present invention.

FIG. 2B shows a top view of the strap manager according to the present invention.

FIG. 2C shows a bottom view of the strap manager according to the present invention.

FIG. 2D shows a right side view of the strap manager according to the present invention.

FIG. 2E shows a left view of the strap manager according to the present invention.

FIG. 3A shows a top view of the strap manager according to the present invention with a strap end inserted into a center section of the strap manager.

FIG. 3B shows an end view of the strap manager according to the present invention with the strap end inserted into the center section of the strap manager.

FIG. 3C shows the side view of the strap manager according to the present invention with a strap end inserted into the center section of the strap manager.

FIG. 4A shows a top view of the strap manager according to the present invention with the strap wound around the strap manager.

FIG. 4B shows an end view of the strap manager according to the present invention with the strap wound around the strap manager.

FIG. 4C shows a side view of the strap manager according to the present invention with the strap wound around the strap manager.

FIG. 5A shows a top view of the strap manager according to the present invention with the strap wound around the strap manager and strap manager wings holding the strap.

FIG. 5B shows an end view of the strap manager according to the present invention with the strap wound around the strap manager and strap manager wings holding the strap.

FIG. 5C shows a side view of the strap manager according to the present invention with the strap wound around the strap manager and strap manager wings holding the strap.

FIG. 6 shows a top and front view of a second embodiment of a strap manager according to the present invention.

FIG. 7A shows a front view of the second embodiment of the strap manager according to the present invention.

FIG. 7B shows a top view of the second embodiment of the strap manager according to the present invention.

FIG. 7C shows a bottom view of the second embodiment of the strap manager according to the present invention.

FIG. 7D shows a right side view of the second embodiment of the strap manager according to the present invention.

FIG. 7E shows a left view of the second embodiment of the strap manager according to the present invention.

Corresponding reference characters indicate corresponding components throughout the several views of the drawings.

DETAILED DESCRIPTION OF THE INVENTION

Figure 8:
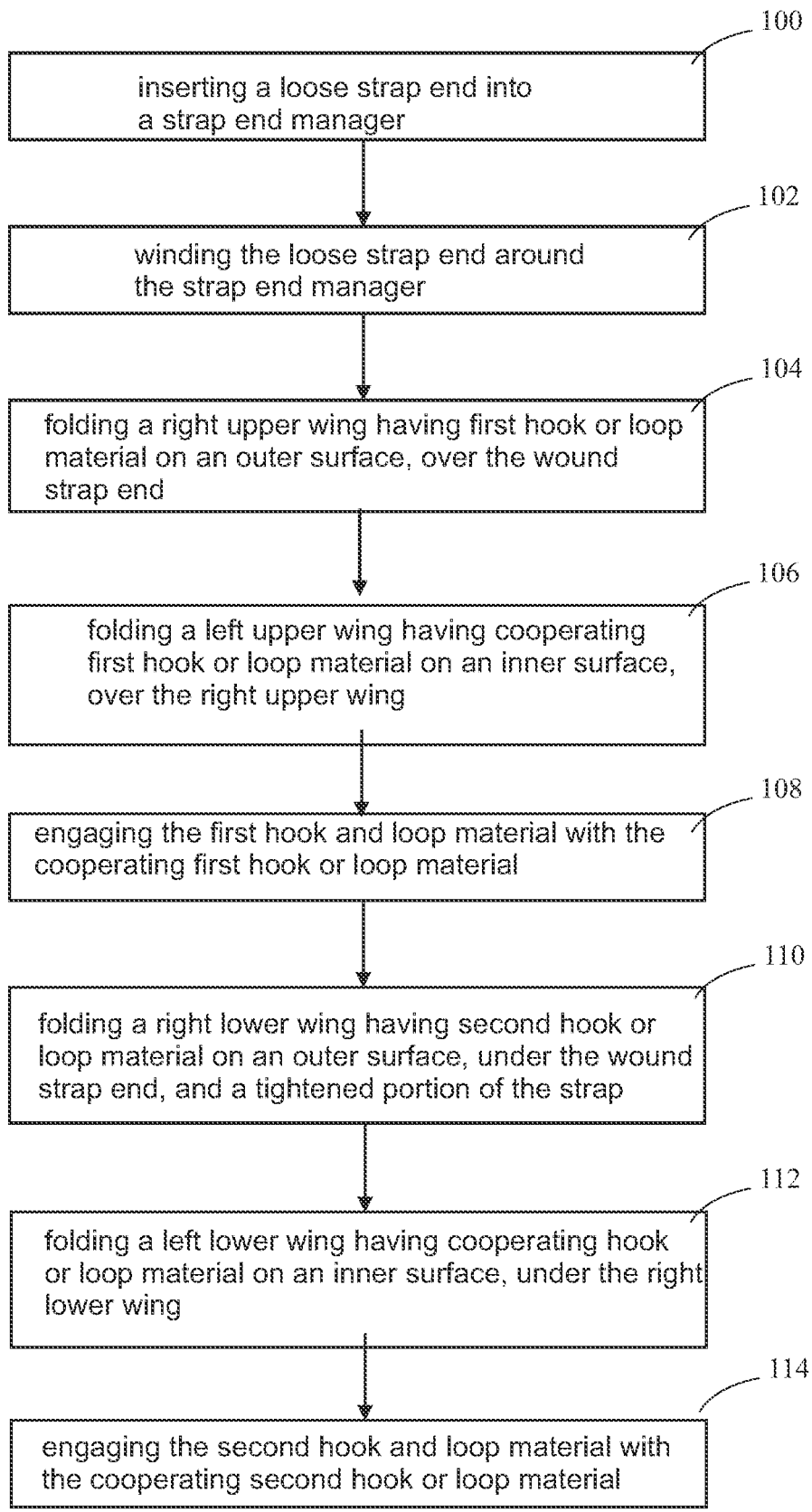
FIG. 8 shows a method for securing a lost strap end according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value. Where a shape is described as generally, the shape need not be precise and may have irregularities resulting from manufacturing, but is sufficient close to the described shape to provide the intended function.

The term "facing" describes the exposure of attaching surfaces.

A top and front view of a strap manager 10 according to the present invention is shown in FIG. 1, a front view of the strap manager 10 is shown in FIG. 2A, a top view of the strap manager 10 is shown in FIG. 2B, a bottom view of the strap manager 10 is shown in FIG. 2C, a right side view of the strap manager 10 is shown in FIG. 2D, and a left view of the strap manager 10 is shown in FIG. 2E. The strap manager 10 includes a center portion 12 having a mouth 11, and left and right wing portions 13 and 14. The wing portion 13 includes an upper right wing 13a and a lower right wing 13b, and the wing portion 14 includes an upper left wing 14a and a lower left wing 14b.

Attaching material 16 is fixed to a top surface of the upper left wing 14a facing up and to a bottom surface of the lower right wing 14b facing down. Attaching material 18 is fixed to a bottom surface of the upper right wing 13a facing down, and to a top surface of the lower right wing 13b facing up. The attaching material 16 and 18 may be attached to any top or bottom surfaces of the wing portions 13 and 14 allowing attachment of the top wing 13a to the top wing 14a and the bottom wing 13b to the bottom wing 14b, as shown in FIGS. 5A-5C. The attaching material 16 and 18 is preferably hook and loop material and is attached facing away from the right and left wing portions 13 and 14 to allow engaging material to attach.

The mouth 11 in the center portion 12 has a width W1 preferably between ⅛ and ½ inches wider than a strap width Ws (see FIG. 3A), and the width W1 is more preferably about ¼ inches wider than the strap width Ws for narrow straps, and ½ inch wider than the strap for a wide and thicker strap 20. For example, the width W1 is preferably 1¼ inches for a one inch wide strap 20, 2¼ inches for a two inch wide strap 20, and preferably 4½ inches for a four inch wide strap 20. The wing portions have widths W2 and W3 preferably between ½ and one inch wider than the strap width Ws. For example, the widths W2 and W3 are preferably 1⅝ inches for a one inch wide strap 20, 2⅞ inches for a two inch wide strap 20, and preferably 4¼ inches for a four inch wide strap 20. The strap manager 10 has a length L of preferably between 1½ and 2½ inches, and more preferably about two inches, and is preferably made of the same material or the like, as the strap 20.

A top view of the strap manager 10 with a strap end 21 of the strap 20 inserted into the mouth 11 is shown in FIG. 3A, an end view of the strap manager 10 with the strap end 21 inserted into the mouth 11 of the strap manager 10 is shown in FIG. 3B, and a side view of the strap manager 10 with the strap end 21 inserted into the mouth 11 is shown in FIG. 3B.

A top view of the strap manager 10 with the strap 20 wound around the strap manager is shown in FIG. 4A, an end view of the strap manager 10 with the strap 20 wound around the strap manager is shown in FIG. 4B, and a side view of the strap manager 10 with the strap 20 wound around the strap manager is shown in FIG. 4C.

A top view of the strap manager 10 with the strap 20 wound around the strap manager and strap manager wings 13 and 14 holding the strap 20 is shown in FIG. 5A, an end view of the strap manager 10 with the strap 20 wound around the strap manager and strap manager wings 13 and 14 holding the strap 20 is shown in FIG. 5B, and a side view of the strap manager 10 with the strap 20 wound around the strap manager and strap manager wings 13 and 14 holding the strap 20 is shown in FIG. 5C. The attaching materials 16 and 18 are pressed together to retain the wings 13 and 14 over the wound strap 10. The lower wings 13b and 14b further are around a tight strap portion 22. The attaching materials 16 and 18 are preferably cooperating hook and loop material or the like, but may be buckles, snaps, button, ties, or any suitable attachment. The strap manager 10 may be two pieces of strap material attached by stitching 15 (see FIG. 2B) to separate the wings 13 and 14 from the center portion 12, and in some embodiments, the wings 13 and 14 and/or the entire strap manager 10 may be made of an elastic material.

A top and front view of a second embodiment of a strap manager 10a is shown in FIG. 6, a front view of the second embodiment of the strap manager 10a is shown in FIG. 7A, a top view of the second embodiment of the strap manager 10a is shown in FIG. 7B, a bottom view of the second manager 10a is shown in FIG. 7C, a right side view of the second embodiment of the strap manager 10a is shown in FIG. 7D, and a left view of the second embodiment of the strap manager 10a is shown in FIG. 7E. The strap manager 10a is similar to the strap manager 10 described above, with the exception that the attaching material 16 and 18 extends from the center portion 12 instead of attaching onto the center portion. The attaching material 16 and 18 is preferably attached to the center portion 12 by stitching 15a, but may be attached in any suitable manner, and the attaching materials 16 and 18 are attached to the center portion 12 so that cooperating hook and loop material engage when the right and left wing portions 13 and 14 are folded as shown in FIG. 5A-5C. For example, the attaching material 16 is attached with an attaching surface facing out and the attaching material 18 is attached with an attaching surface facing in, or any combination so that the attaching material 16 and 18 may engage when the right and left wing portions 13 and 14 are folded as shown in FIG. 5A-5C.

FIG. 8 shows a method for securing a loose strap end according to the present invention. The method includes inserting a loose strap end into a strap end manager at step 100, winding the loose strap end around the strap end manager at step 102, folding a right upper wing having first hook or loop material on an outer surface, over the wound strap end at step 104, folding a left upper wing having cooperating first hook or loop material on an inner surface, over the right upper wing at step 106, engaging the first hook and loop material, engaging the first hook and loop material with the cooperating first hook or loop material at step 108, folding a right lower wing having second hook or loop material on an outer surface, under the wound strap end, and a tightened portion of the strap at step 110, folding a left lower wing having cooperating hook or loop material on an inner surface, under the right lower wing at step 112, and engaging the second hook and loop material with the cooperating second hook or loop material at step 114. Those skilled in the art will recognize that the hook and loop material may be replaced by buckles, snaps, button, ties, or any suitable attachment and a strap end manager utilizing any attachment type to connect the wings is intended to come within the scope of the present invention The strap manager 10 may further be used to store cargo straps using the method of FIG. 8, however, the lower wings are not wrapped around a tightened strap portion.

While the invention herein disclosed has been described by means of specific embodiments and applications thereof, numerous modifications and variations could be made thereto by those skilled in the art without departing from the scope of the invention set forth in the claims.

I claim:

1. A strap manager, comprising:
   a center portion;
   a mouth in the center portion, the mouth configured to accept a strap end;
   a right wing portion extending from the center portion and out from a right side of the mouth and comprising a right upper wing and a right lower wing;
   the right upper wing includes a first attaching material;
   the right lower wing includes a second attaching material;
   a left wing portion extending from the center portion and out from a left side of the mouth comprising a left upper wing and a left lower wing;
   the left upper wing includes a first cooperating attaching material;
   the left lower wing includes a second cooperating attaching material;
   wherein;
      the right upper wing and the left upper wing are foldable over the center portion attaching the first attaching material to the first cooperating attaching material, forming a first closed perimeter; and
      the right lower wing and the left lower wing are foldable under the center portion attaching the second attaching material to the second cooperating attaching material, forming a second closed perimeter.

2. The strap manager of claim 1, wherein:
   a top of the center portion, the right upper wing, and the left upper wing, are a single portion of generally rectangular upper material; and
   a bottom of the center portion, the right lower wing, and the left lower wing, are a second single portion of generally rectangular lower material.

3. The strap manager of claim 2, wherein:
   the upper material and the lower material reach the entire width of the strap manager;
   the first attaching material is attached outside the right upper wing and the second attaching material is attached outside the right lower wing; and
   the first cooperating attaching material is attached inside the left upper wing and the second cooperating attaching material is attached inside the left lower wing.

4. The strap manager of claim 2, wherein:
   the upper material and the lower material reach past right and left sides of the mouth;
   the first and second attaching material and first and second cooperating attaching material are attached extending to the right and left from the upper material and the lower material; and
   cooperating surfaces of the first and second attaching material and first and second cooperating attaching material face to engage when the wings are folded over and under the center portion.

5. The strap manager of claim 2, wherein:
   the first attaching material is attached to the right upper wing facing up when the right upper wing is extended to the right and the second attaching material is attached to the right lower wing facing down when the right lower wing is extended to the right; and
   the first cooperating attaching material is attached to the left upper wing facing down when the left upper wing is extended to the left and the second cooperating attaching material is attached to the left lower wing facing up when the right lower wing is extended to the left.

6. The strap manager of claim 1, wherein the mouth is about 4.5 inches wide and the wings are about 4.25 inches wide.

7. The strap manager of claim 1, wherein the mouth is about 2.25 inches wide and the wings are about 2.875 inches wide.

8. The strap manager of claim 1, wherein the mouth is about 1.25 inches wide and the wings are about 1.625 inches wide.

9. The strap manager of claim 1, wherein the mouth has a mouth width between ⅛ and ½ inches wider than a strap width and the wings have a wing width between ½ and one inch wider than the strap width.

10. The strap manager of claim 1, wherein the first attaching material and the first cooperating attaching material are cooperating hook and loop materials and the second attaching material and the first cooperating attaching material are cooperating hook and loop materials.

11. The strap manager of claim 1, wherein:
    the first attaching material is a hook material and the first cooperating material is a loop material and the second attaching material is a hook material and the second cooperating material is a loop material.

12. The strap manager of claim 1, wherein:
    the first attaching material is a loop material and the first cooperating material is a hook material and the second attaching material is a loop material and the second cooperating material is a hook material.

13. The strap manager of claim 1, wherein:
    the first attaching material is a hook material and the first cooperating material is a loop material and the second attaching material is a loop material and the second cooperating material is a hook material.

14. The strap manager of claim 1, wherein:
    the first attaching material is a hook material and the first cooperating material is a loop material and the second attaching material is a loop material and the second cooperating material is a hook material.

15. The strap manager of claim 1, wherein:
    the mouth is configured to receive a strap end;
    the right upper wing is configured to reach from the right of the center portion and fold over a strap wound around the strap manager and position the first attaching material facing down;
    the left upper wing is configured to reach from the left of the center portion and fold over the strap wound around the strap manager and position the first cooperating attaching material facing up and engaging the first attaching material of the right upper wing;
    the right lower wing is configured to reach from the right of the center portion and fold under the strap wound around the strap manager and position the second attaching material facing up;
    the left lower wing is configured to reach from the left of the center portion and fold under the strap wound around the strap manager and position the second cooperating attaching material facing up and engaging the second attaching material of the right lower wing.

16. The strap manager of claim 1, wherein:
the first attaching material is attachable to the first cooperating attaching material and is not attachable to the second attaching material; and
the second attaching material is attachable to the second cooperating attaching material and is not attachable to the first attaching material.

17. The strap manager of claim 16, wherein:
the first attaching material and the second attaching material are on facing away surfaces of the right upper wing and the right lower wing respectively when the wings are extended and not folded; and
the second cooperating attaching material and the second cooperating attaching material are facing surfaces of the left upper wing and the left lower wing respectively when the wings are extended and not folded.

18. The strap manager of claim 1, wherein:
with the wings extending away from the sides of the center portion and not folded, the first attaching material and the second attaching material of the right wings are facing away from each other; and
with the wings extending away from the sides of the center portion and not folded, the first cooperating attaching material and the second cooperating attaching material of the left wings are facing towards each other.

19. A strap manager, comprising:
a center portion;
a mouth in the center portion, the mouth configured to accept a strap end;
a right wing portion extending from the center portion and out from a right side of the mouth and comprising a right upper wing and a right lower wing;
the right upper wing includes a first attaching material;
the right lower wing includes a second attaching material;
a left wing portion extending from the center portion and out from a left side of the mouth and comprising a left upper wing and a left lower wing;
the left upper wing includes a first cooperating attaching material;
the left lower wing includes a second cooperating attaching material;
wherein;
the right upper wing, a top of the center portion, and the left upper wing formed from a single piece upper material;
the right lower wing, a bottom of the center portion, and the left lower wing formed from a single piece lower material;
the right upper wing and the left upper wing are foldable over the center portion attaching the first attaching material to the first cooperating attaching material, forming a first closed perimeter; and
the right lower wing and the left lower wing are foldable under the center portion attaching the second attaching material to the second cooperating attaching material, forming a second closed perimeter.

20. A strap manager, comprising:
a center portion;
a closed perimeter mouth in the center portion, the mouth configured to accept a strap end;
a right wing portion extending from the center portion and out from a right side of the mouth and comprising a right upper wing and a right lower wing;
the right upper wing includes a first attaching material;
the right lower wing includes a second attaching material;
a left wing portion extending from the center portion and out from a left side of the mouth comprising a left upper wing and a left lower wing;
the left upper wing includes a first cooperating attaching material;
the left lower wing includes a second cooperating attaching material;
wherein;
the right upper wing and the left upper wing are foldable over the center portion attaching the first attaching material to the first cooperating attaching material, forming a first closed perimeter; and
the right lower wing and the left lower wing are foldable under the center portion attaching the second attaching material to the second cooperating attaching material, forming a second closed perimeter.

* * * * *